Jan. 31, 1933.   E. F. FISHER   1,895,652
COOLING SYSTEM
Filed July 17, 1929
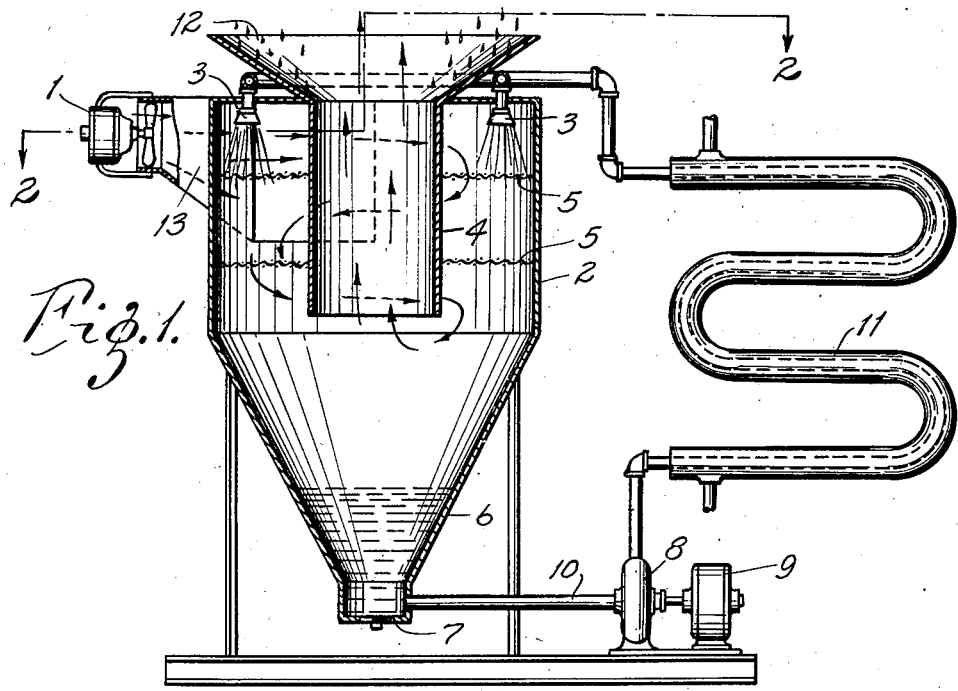
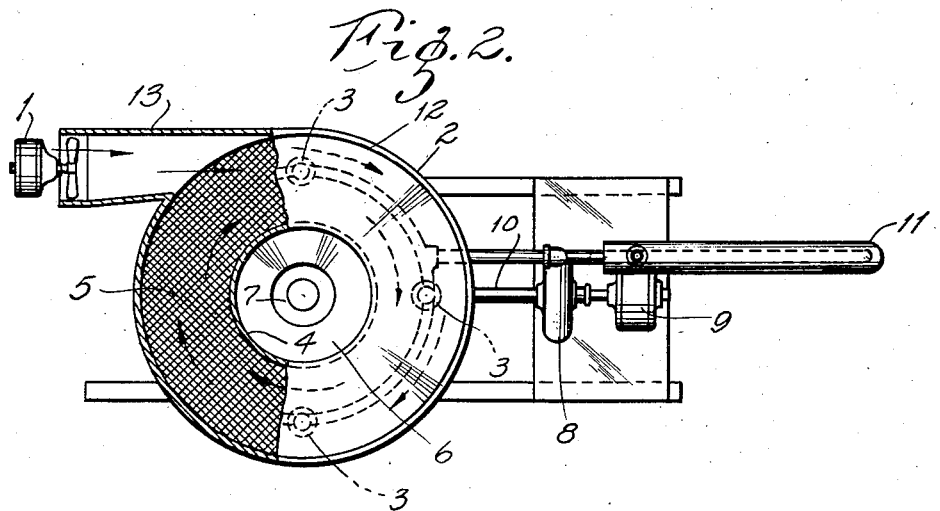
INVENTOR
Ernest F. Fisher Patented Jan. 31, 1933

1,895,652

UNITED STATES PATENT OFFICE

ERNEST F. FISHER, OF ST. LOUIS, MISSOURI

COOLING SYSTEM

Application filed July 17, 1929. Serial No. 381,352.

The present invention relates to apparatus for removing heat from water that has been used in a condensing or cooling system having application to refrigeration, oil refining, the cooling of internal combustion engine cylinders and various other applications where water is used over and over again for transferring heat in process work.

One of the principal objects of my invention is to provide a cooling system employing air in intimate contact with water in a finely divided state so as to evaporate a part of the water and in so doing, lower the temperature of the water to near the wet bulb temperature of the atmosphere.

Another object of my invention is to provide an improved method of and means for circulating the air in conjunction with the water spray.

The accompanying drawing is a diagrammatic representation of a preferred embodiment of my improved cooling system.

Figure 1 is a vertical cross-section of the cooling chamber.

Figure 2 is a horizontal cross-section of the cooling chamber.

The body of air is circulated through the system under the impelling action of a suitable fan or blower 1 which discharges tangentially through the inlet 13 into circular chamber 2. This imparts to the air a swirling motion around the central tube 4 and causes the air to mix intimately with the water spray issuing from the spray nozzles 3. The water and air are further mixed by coming in contact with screens 5. The swirling motion imparted to the air in chamber 2 causes a vortex at the bottom of the tube 4 thus reducing the pressure in the bottom conical part of chamber 2 causing more rapid evaporation of the water spray in a slightly rarified atmosphere and thus further cooling the water as it falls into the bottom conical part of chamber 2. After swirling around in chamber 2, the air finally finds its exit through tube 4 to the atmosphere and the water falls to chamber 6 below. From this chamber or sump it is pumped through the condensing coils 11 by pump 8 back to nozzles 3 to continue the cycle. Make up water is provided by rain falling in the funnel 12.

I claim:

1. A cooling apparatus comprising a conical chamber in the form of an inverted cone the sides of which terminate in a cylindrical chamber, a tube alined axially within said chamber, one end of said tube communicating with the interior of said chamber at a point near the junction between said inverted cone and said chamber and the opposite end of said tube being open to the atmosphere, a water-spraying device within said chamber but outside of said tube, a blower for blowing air tangentially to the tube, and a series of pervious elements arranged in the path of the air and water passing through the apparatus but located outside of said tube.

2. A cooling apparatus comprising a substantially cylindrical chamber, the lower portion of which is tapered in the form of an inverted cone, the top of said chamber being closed to the atmosphere by a wall, a vertical tube passing through the top wall of said chamber with the upper end of said tube communicating with the atmosphere and its lower end extending substantially to the bottom of said cylindrical chamber near the point where the cylindrical chamber begins to taper, said tube cooperating with the wall of said cylindrical chamber to provide an annular air space, a blower located so as to discharge a stream of air through said annular air space and tangentially to said tube, and a series of reticulated elements arranged in the path of the air passing through the apparatus but located outside of said tube, and spraying nozzles for spraying water on said reticulated elements.

3. A cooling apparatus comprising a chamber, a tube axially alined within said chamber in a manner to provide a circular passageway through which air which passes tangentially into said chamber moves, one end of said tube communicating with the interior of said chamber at the lower end thereof, and the other end of said tube being open to atmosphere, a water-spraying device within said chamber and outside of said tube, and a pervious element arranged in the path of the air and water passing through the apparatus but located outside of said tube.

4. A cooling apparatus comprising a chamber, a tube axially alined within said chamber, one end of said tube communicating with the interior of the chamber at the lower end thereof and the other end of said tube being open to the atmosphere, a water-spraying device within said chamber and outside of said tube, a blower located so as to discharge air into said chamber tangentially to said tube, water-retaining elements arranged in the path of the air and water passing through the apparatus but located outside of said tube.

ERNEST F. FISHER.